United States Patent
Urman et al.

(10) Patent No.: US 11,438,266 B2
(45) Date of Patent: Sep. 6, 2022

(54) GENERIC PACKET HEADER INSERTION AND REMOVAL

(71) Applicant: MELLANOX TECHNOLOGIES, LTD., Yokneam (IL)

(72) Inventors: Avi Urman, Yokneam Illit (IL); Lior Narkis, Petah-Tikva (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 109 days.

(21) Appl. No.: 16/780,940

(22) Filed: Feb. 4, 2020

(65) Prior Publication Data
US 2021/0243121 A1  Aug. 5, 2021

(51) Int. Cl.
*H04L 45/74* (2022.01)
*G06F 13/42* (2006.01)
*H04L 69/22* (2022.01)

(52) U.S. Cl.
CPC .......... *H04L 45/74* (2013.01); *G06F 13/4221* (2013.01); *H04L 69/22* (2013.01); *G06F 2213/0024* (2013.01)

(58) Field of Classification Search
CPC ..... H04L 45/74; H04L 69/22; G06F 13/4221; G06F 2213/0024
See application file for complete search history.

(56) References Cited

U.S. PATENT DOCUMENTS

| | | | |
|---|---|---|---|
| 7,003,118 B1 | 2/2006 | Yang et al. | |
| 9,344,377 B2 | 5/2016 | Pong et al. | |
| 9,397,960 B2 | 7/2016 | Arad et al. | |
| 9,860,168 B1 | 1/2018 | Seshadri | |
| 10,027,601 B2 | 7/2018 | Narkis et al. | |
| 10,069,946 B2 | 9/2018 | Davis | |
| 2002/0080789 A1* | 6/2002 | Henderson | H04L 45/60 370/392 |
| 2003/0053448 A1* | 3/2003 | Craig | H04L 67/1014 370/353 |
| 2003/0152084 A1* | 8/2003 | Lee | H04L 47/10 370/395.21 |
| 2006/0023729 A1* | 2/2006 | Choi | H04L 65/604 370/428 |

(Continued)

*Primary Examiner* — Gregory B Sefcheck
*Assistant Examiner* — Joshua Smith
(74) *Attorney, Agent, or Firm* — Kligler & Associates Patent Attorneys Ltd

(57) ABSTRACT

A communication apparatus includes a host interface, connected to a peripheral component bus so as to communicate with a CPU and a memory of a host computer. A network interface is connected to a network. Packet processing circuitry is configured to receive from a first interface a data packet including a set of one or more headers that include header fields having respective values, to identify, responsively to at least one of the header fields, a corresponding entry in a header modification table that specifies a header modification operation, to modify the set of headers in accordance with the header modification operation, to check whether the entry specifies an additional header modification operation, to output the modified set of headers if the entry does not specify an additional header modification operation, and, if the entry specifies an additional header modification operation, to feed-back the modified set of headers.

18 Claims, 6 Drawing Sheets

(56) References Cited

U.S. PATENT DOCUMENTS

| | | | |
|---|---|---|---|
| 2011/0268123 A1* | 11/2011 | Kopelman | H04L 69/22 370/392 |
| 2012/0051259 A1* | 3/2012 | Gintis | H04L 45/50 370/253 |
| 2013/0003725 A1* | 1/2013 | Hendel | H04L 49/505 370/353 |
| 2013/0114413 A1* | 5/2013 | Song | H04L 49/9042 370/237 |
| 2013/0219091 A1* | 8/2013 | Stark | H04L 45/50 29/829 |
| 2014/0250239 A1* | 9/2014 | Lambert | H04L 47/13 709/242 |
| 2014/0269718 A1* | 9/2014 | Goyal | H04L 45/74 370/392 |
| 2015/0304209 A1* | 10/2015 | Choudhury | H04L 45/26 370/255 |
| 2017/0339259 A1* | 11/2017 | Arad | H04L 49/253 |
| 2019/0379767 A1* | 12/2019 | Sharma | H04L 49/9026 |
| 2020/0076928 A1* | 3/2020 | Wang | H04L 45/742 |

* cited by examiner

```
1   While (processing packet)
2   Fetch Next Action.
3   If Action == remove_complete_header
4       Start_offset = parser_offsets[action.start_anchor]
5       End_offset = parser_offsets [action.end_anchor]
6       Delete data packet [Start_offset] until packet [End_offset]
7       Reparse packet
8   If Action == remove_partial_header
9       Start_offset = parser_offsets[action.start_anchor]+action.start_offset
10      End_offset = parser_offsets[action.end_anchor]+action.end_offset
11      Delete data packet [Start_offset] until packet [End_offset]
12      Reparse packet
13  If Action == insert_header_inline
14      Start_offset = parser_offsets[action.start_anchor]+action.start_offset
15      Insert hole from packet [Start_offset] with action.size
16      Insert action.inline_data into packet [Start_offset]
17      Reparse packet
18  If Action == insert_header_with_pointer
19      Start_offset = parser_offsets[action.start_anchor]+action.start_offset
20      Insert hole from packet [Start_offset] with action.size
21      Data = Fetch data from pointer in the memory
22      Insert Data into packet [Start_offset]
23      Reparse packet
24  Else
25      Regular action processing
```

FIG. 3

GENERIC PACKET HEADER INSERTION AND REMOVAL

FIELD OF THE INVENTION

The present invention relates generally to packet communication networks, and particularly to methods and apparatus for processing of packet headers.

BACKGROUND

Packet headers contain protocol information that enables network elements, such as switches, routers, and host computers, to process and steer packets to their destinations. Many network functions involve header processing. U.S. Pat. No. 10,027,601, whose disclosure is incorporated herein by reference, describes techniques for packet header processing, and particularly for implementation of header processing functions in a NIC.

SUMMARY

An embodiment of the present invention that is described herein provides a communication apparatus including a host interface, a network interface and packet processing circuitry. The host interface is configured to be connected to a peripheral component bus so as to communicate via the bus with a central processing unit (CPU) and a memory of a host computer. The network interface is configured to be connected to a network so as to transmit outgoing data packets to the network and receive incoming data packets from the network. The packet processing circuitry is coupled between the host interface and the network interface and includes a parser, a header processor and a packet merger. The parser is configured to receive from a first interface, selected from among the host interface and the network interface, a data packet including a set of one or more headers that include header fields having respective values, and to identify, responsively to a value of at least one of the header fields, a corresponding entry in a header modification table that specifies a header modification operation. The header processor is configured to receive the headers and the header modification operation from the parser, to modify the set of headers in accordance with the header modification operation, to check whether the entry specifies an additional header modification operation, to output the modified set of headers if the entry does not specify an additional header modification operation, and, if the entry specifies an additional header modification operation, to feed-back the modified set of headers to the parser. The packet merger is configured to transmit the data packet, with the modified set of headers output by the header processor, through a second interface selected from among the host interface and the network interface.

In some embodiments, the header modification operation includes insertion of one or more fields in a specified location in the set of headers. In an example embodiment, the one or more fields to be inserted are one or more protocol-specific headers. In an embodiment, values of the one or more fields to be inserted are specified in the entry. In a disclosed embodiment, the entry includes a pointer to a memory address in which values of the one or more fields to be inserted are stored, and the header processor is configured to read the one or more values from the memory location and insert the one or more values into the set of headers. In another embodiment, the header processor is configured to create a gap in the set of headers, and to insert one or more fields in the gap.

In some embodiments, the header modification operation includes removal of one or more fields from a specified location in the set of headers. In an example embodiment, the one or more fields to be removed are one or more protocol-specific headers.

In an embodiment, one of the first and second interfaces is the host interface and the other of the first and second interfaces is the network interface. In another embodiment, both the first and second interfaces are the network interface, such that the data packet is received from the network and is looped back to the network after modification of the header. In yet another embodiment, both the first and second interfaces are the host interface, such that the data packet is received from a process running on the CPU and is looped back, after modification of the header, to another process running on the CPU.

In a disclosed embodiment, the packet processing circuitry is configured to identify, responsively to the modified set of headers, a steering instruction in a packet steering table, and to steer the packet to a destination via the second interface in accordance with the identified steering instructions. In an embodiment, the header modification table is stored in the memory of the host computer and is accessed by the packet processing circuitry via the peripheral component bus.

There is additionally provided, in accordance with an embodiment of the present invention, a method for communication including connecting a host interface to a peripheral component bus so as to communicate via the bus with a central processing unit (CPU) and a memory of a host computer, and connecting a network interface to a network so as to transmit outgoing data packets to the network and receive incoming data packets from the network. Using packet processing circuitry, which is coupled between the host interface and the network interface, a data packet including a set of one or more headers that include header fields having respective values is received from a first interface, selected from among the host interface and the network interface. Responsively to a value of at least one of the header fields, a corresponding entry that specifies a header mod cation operation is identified in a header modification table. The set of headers is modified in accordance with the header modification operation. A check is made as to whether the entry specifies an additional header modification operation. The modified set of headers is output if the entry does not specify an additional header modification operation, and, if the entry specifies an additional header modification operation, the modified set of headers is fed-back. The data packet, with the modified set of headers, is transmitted through a second interface selected from among the host interface and the network interface.

The present invention will be more fully understood from the following detailed description of the embodiments thereof, taken together with the drawings in which:

BRIEF DESCRIPTION OF THE DRAWINGS

FIG. 3 is a listing of a pseudo-code that describes header modification instructions in accordance with embodiments of the present invention;

DETAILED DESCRIPTION OF EMBODIMENTS

Figure 1:
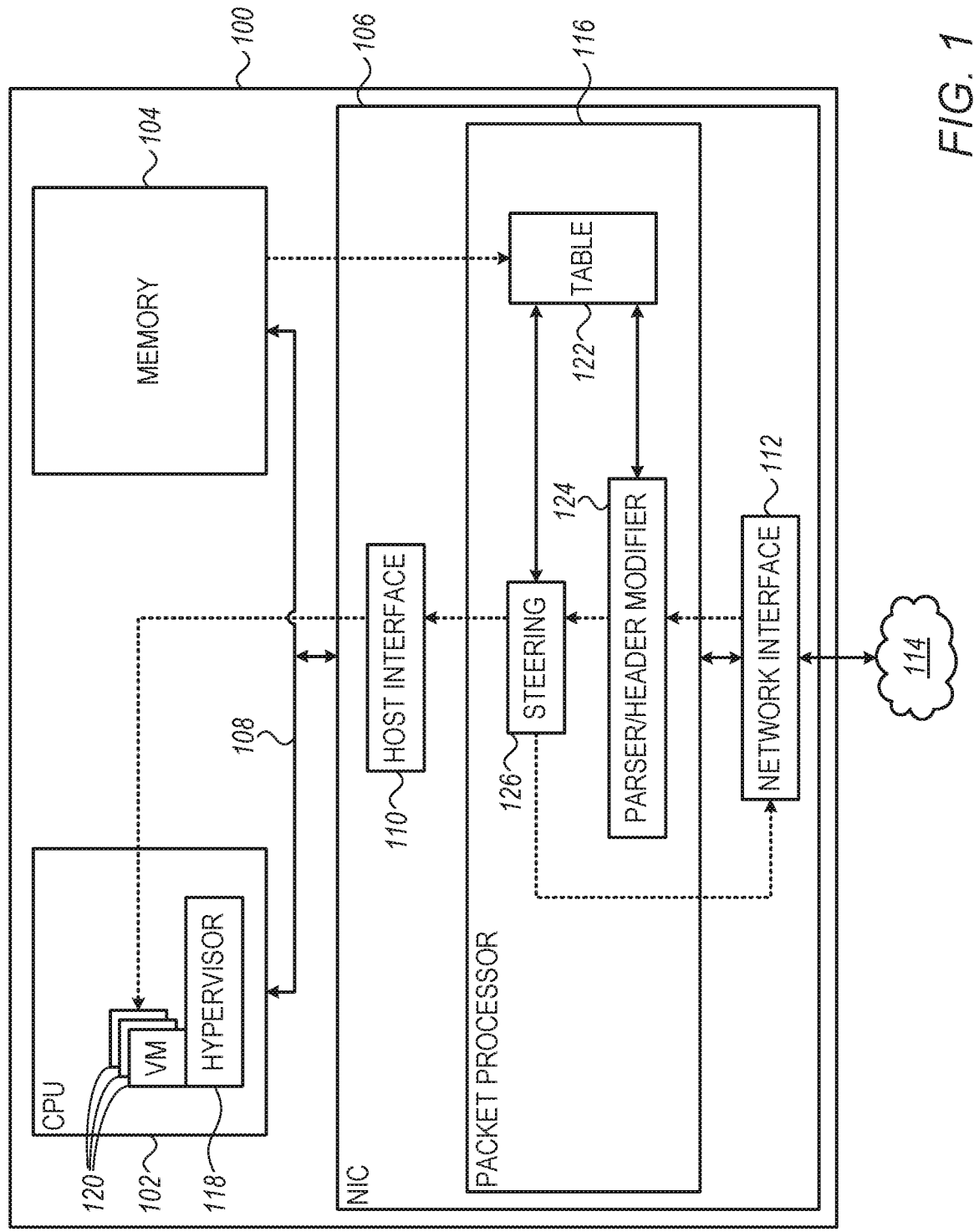
FIG. 1 is block diagram that schematically illustrates a host computer with a NIC that performs header-processing functions, in accordance with an embodiment of the present invention.

Overview network protocols and functions require changes to header fields. Conventional implementation of such functions, e.g., in a network router or switch, would typically require storing large tables in memory and applying complex, high-speed logic to the packets. Alternatively, header modification functions may be carried out by a CPU running suitable software in a network appliance. Both of these solutions, however, have limitations in terms of cost and scalability.

Embodiments of the present invention that are described herein implement header-modification functions in a NIC. This approach has the benefit of exploiting existing NIC interface logic, as well as taking advantage of the direct memory access (DMA) capabilities of the NIC in order to store header modification tables of effectively unlimited size in the host memory. Implementation of a number of simple header-modification primitives in the NIC can then be used, in combination with appropriate tables stored by the host computer, to offload certain network protocols and functions to the NIC. When configured in this manner, the NIC can perform desired header modifications not only on packets exchanged between the network and the host computer to which the NIC belongs, but also on packets that are transmitted to the NIC from the network and then looped back from the NIC to the network after header modification.

The embodiments disclosed in the present patent application relate to communication apparatus, such as a NIC, that comprises a host interface, which is configured to communicate over a peripheral component bus with a CPU and memory of a host computer, and a network interface, which is coupled to a network so as to transmit and receive outgoing and incoming data packets to and from the network.

Packet processing circuitry in the NIC, coupled between the host interface and the network interface, receives data packets from one of the interfaces, modifies packet headers, and then transmits the packets back out—either through another interface or through the same interface through which the packets were received. For this purpose, the packet processing circuitry uses the value of at least one of the header fields of the received packets to look up a corresponding entry in a header modification table, and then modifies the header accordingly. Typically (although not necessarily), the header modification table is stored in the memory of the host computer, that is cached into a table in the packet processing circuitry via the peripheral component bus.

Each header comprises a set of one or more headers, followed by a payload. Some of the header modifications made by the INC may include removing one or more header fields from the set of headers of the packet, and/or inserting one or more new header fields into the set of headers. The header fields that are removed or inserted in this manner may constitute a complete header, typically a protocol-specific header such as a virtual local area network (VLAN) header, a multi-protocol label switching (MPLS) label, a provider backbone bridge (PBB) header, or encapsulation headers of other types.

In some embodiments, the NIC also includes a packet steering table, which contains steering instructions keyed by header field values, as described, for example, in U.S. Patent Application Publication 2013/0114599. Following header modification, the packet processing circuitry uses the modified header to look up the appropriate steering instructions in the packet steering table, and steer the packet to its destination as indicated by the instructions.

In an embodiment, the host computer may run an Application Programming Interface (API), which controls the NIC to execute packet header modifications responsive to commands that the API receives (from a user or, for example, from a script).

System Description

FIG. 1 is a block diagram that schematically illustrates a host computer 100 with a NIC that performs header-processing functions, in accordance with an embodiment of the present invention. (Although the disclosure hereinbelow describes a NIC, embodiments according to the present invention may include, instead, a Host-Channel-Adapter (HCA).)

Host computer 100 comprises a central processing unit (CPU) 102 and a host memory 104, which are connected to NIC 106 by a peripheral component bus 108, such as a PCIe bus.

NIC 106 comprises a Host-Interface 110, which is connected to CPU 102 and memory 104 via bus 108, and a network interface 112, which is connected to a network 114, such as an IP or InfiniBand™ network. Packet processing circuitry 116 in NIC 106 is coupled between interfaces 110 and 112 so as to process incoming data packets that are delivered to computer 100 from network 114 and outgoing packets for transmission to the network. Typically, NIC 106 transmits and receives packets in multiple flows, wherein each such flow corresponds to a queue pair (QP), Ethernet ring, or IP tuple, for example. In virtualized environments, CPU 102 typically runs a hypervisor program 118, which supports multiple virtual machines 120, as is known in the art, and packets that flow to and from computer 100 are typically associated with respective virtual machines.

Packet processing circuitry 116 in NIC 106 handles incoming packets from network 114 by looking up the values of certain header fields in a set of look-up tables (LUTs) that are stored in a Table 122. Table 122 is typically loaded from memory 104 via bus 108, either by software or by other means. Additionally or alternatively, table 122 may be smaller than the full set of LUTs, and packet processor 116 may cache frequently used table entries from memory 104 into table 122, for quick access. In some embodiments, table 122 may be a content-addressable memory (CAM).

Table 122 typically stores both header modification instructions and packet steering instructions. The packet processor accesses the LUT, using one or more fields of the headers as index, to extract header modification instructions (including operations and parameters), and to extract steering instructions. The header modification instructions are carried out by a parser/header modifier 124, which parses the packets and adds and/or removes partial or complete header fields as instructed. The packet steering instructions are carried out by a steering logic 126. Depending on the instructions provided by table 122, steering logic 126 may steer the packet through host interface 110 to the appropriate destination VM 120 and process on CPU 102, or may loop the packet back through network interface 112 to network 114. (In actuality, when a packet is to be delivered to a process on CPU 102, steering logic 126 typically causes NIC 106 to write the packet to memory 104, and then to alert the appropriate VM 120, for example by issuing an interrupt.) Further features of LUTs of this sort and their use in packet steering are described in the above-mentioned U.S. Patent Application Publication 2013/0114599.

Although FIG. 1 shows only incoming packet flows from network 114 to host computer 100, packet processor 116 can additionally or alternatively operate in a similar fashion on outgoing packets passed to NIC 106 by processes running on CPU 102. After header modification, such packets are either transmitted out to network 114 via network interface 112 or may be looped back to another process (typically running on another virtual machine 120) on CPU 102.

In some embodiments, CPU 102 comprises a general-purpose processor, which is programmed in software to carry out the functions described herein. The software may be downloaded to the processor in electronic form, over a network or from a host, for example or it may, alternatively or additionally, be provided and/or stored on non-transitory tangible media, such as magnetic, optical, or electronic memory. In an embodiment, CPU 102 may be a plurality of processors, of the same or of different types.

Although packet processor 116 is shown in FIG. 1, for the sake of conceptual clarity, as an independent functional block, in practice the functions of the packet processor are typically integrated with other packet processing functions of NIC 106 in a single integrated circuit. NIC 106 may be implemented in this context by means of dedicated or programmable logic circuits or, additionally or alternatively, by software or firmware running on a programmable processing core. All such implementations are considered to be within the scope of the present invention. The remaining packet processing functions of circuitry NIC 106 will be apparent to those skilled in the art and are omitted herein for the sake of brevity.

Header Modification Operations

In embodiments according to the present invention, packet processor 116 is configured to execute at least the following header modification operations:

Insert Header In-Line. This instruction inserts an in-line header in the packet ("in-line", in this respect, means that the header is part of the instruction; e.g., a parameter).

Insert Header with Pointer. This instruction reads a header from memory 104, and inserts the header in the packet.

Remove Complete Headers. This instruction removes a complete header or headers from the packet.

Remove Partial Headers. This instruction removes partial header (i.e., header portion, as opposed to complete header) or headers from the packet.

Parameters that are associated with the four operations are stored in table 122 and include a Start-Anchor, which points to a start address in the packet; an End-Anchor, which points to an end address in the packet; Start and End offset, which may be added to the start and end anchors in some of the operations, a Size parameter, which may indicate a size of a new header that is inserted in the packet, and, a Pointer, which points to an address in memory 104 in which a new header may be stored.

Start-Anchor, or, in some instructions, the sum of start anchor and start offset, points to the location in the packet from which a header-insertion or a header-removal starts. Similarly, end-Anchor, or, in some instructions, the sum of end anchor and end offset, points to the location in the packet at which a header-insertion or a header-removal ends. We will hereinbelow refer to the aggregation of a header operation and associated parameter as a header instruction.

Table 122 typically further stores a next-operation indication, which indicates whether further header modification operations for the current packet are required.

The header operations described above typically refer to various header types, typically protocol-specific headers such as Medium-Access Control header (MAC), Internet Protocol (IP) header, Transmission Control Protocol (TCP) header, User Datagram Protocol (UDP) etc. Generally, however, the disclosed techniques are not limited to any particular type of header, and may be used for inserting and/or removing any other suitable header types or parts thereof.

Figure 2:
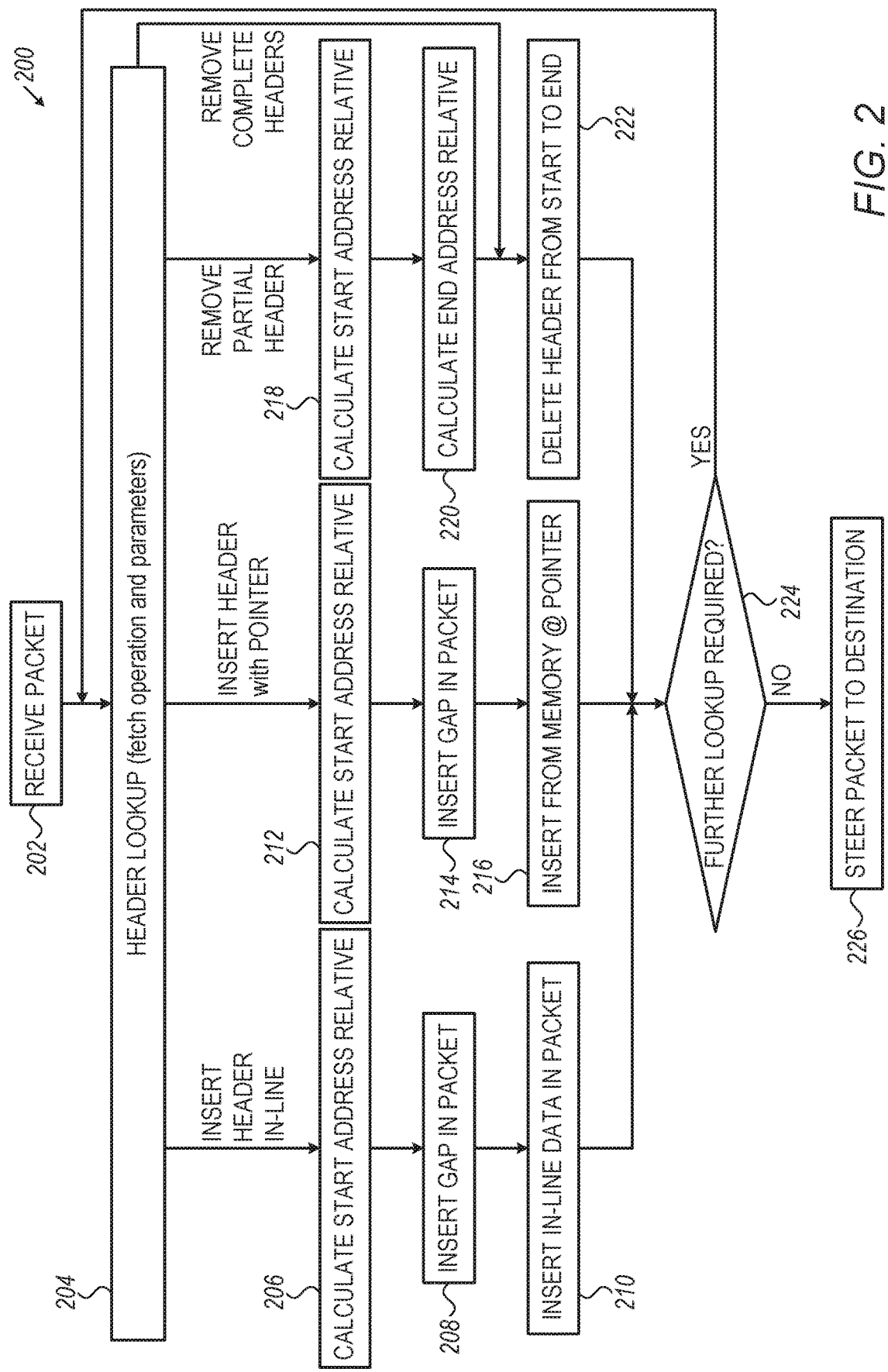
FIG. 2 is a flow chart that schematically illustrates a method for header modification, in accordance with an embodiment of the present invention.

FIG. 2 is a flow chart 200 that schematically illustrates a method for header modification, in accordance with an embodiment of the present invention. The method is described here, for the sake of convenience and clarity, with respect to the elements of NIC 106 that are shown in FIG. 1. The principles of the method, however, are equally applicable, mutatis mutandis, in other sorts of hardware implementations. Such alternative implementations will be apparent to those skilled in the art after reading the present description and are considered to be within the scope of the present invention.

The method of FIG. 2 is initiated when packet processing circuitry 116 receives a packet for processing, at a packet reception step 202. The packet comprises a set of (one or more) headers. As noted earlier, the method may be applied both to incoming packets received by NIC 106 via network interface 112 and to outgoing packets received via host interface 110. In the case of multicast packets, packet processing circuitry 116 may be required to create multiple copies of the packet for transmission to different destinations. In this case, parser/header-modifier 124 may perform the required header modifications before duplication (such that the same modifications apply to all of the copies) or after duplication (whereby each copy may be modified independently).

At a Header Lookup step 204, parser/header-modifier 124 looks up the appropriate header field of the packet in table 122 and receives the required header instruction, including all parameters.

If the operation code that is fetched in step 204 is Insert-Header-Inline, the parser/header-modifier will enter a Calculating-Start-Address-Relative step 206, and calculate start address by adding the start-anchor parameter to the start-offset parameter. The parser/header-modifier will then proceed to an Inserting-Gap step 208 and create a gap in the header, starting at the start address (that was calculated in step 206). The length of the gap equals the Size parameter (fetched in step 204). Next, the parser/header-modifier will enter an Inserting-In-Line-Data step 210, and insert the new-header parameter in the gap. Step 210 concludes the Insert-Header-In-Line operation.

If, in step 204, an Insert-Header-with-Pointer operation is required, the parser/header-modifier will enter a Calculating-Start-Address-Relative step 212, followed by an Inserting-Gap step 214 (steps 212 and 214 are identical, respectively, to steps 206 and 208). Next, in an Inserting-From-Memory step 216, the parser/header-modifier reads data from the memory, starting at an address which is equal to the pointer parameter (fetched in step 204), and inserts the data in the gap created in the packet, from the start address that was calculated in step 212. The Insert-Header-with-Pointer instruction is now completed.

If, in step 204, a Remove-Partial-Header operation is required, the parser/header-modifier enters a Calculating-Start-Address-Relative step 218, which is identical to Calculating-Start-Address-Relative step 206, and then enters a Calculating-End-Address-Relative step 220. In step 220, the parser/header-modifier calculates an End address by adding the End-Anchor parameter to the End-Offset parameter (both parameters were fetched in step 204). The Header Modification Logic next enters a Deleting-Header step 222 and deletes the packet header, from the start address to the end address. The Remove-Partial-Header operation is now concluded.

If, in step 204, a Remove-Complete-Headers operation is required, the start and the end addresses are the start-anchor and end-anchor parameters; the parser/header-modifier enters step 222 and deletes the header/headers, concluding the Remove-Complete-Headers operation.

After step 210, 216 and 222, the current header operation completed, and the parser/header-modifier checks if table 122 indicates that another lookup is to be performed, at a Further Lookup Check step 224. If so, parser/header-modifier 124 returns to step 204 and fetches from table 122 the next header operation for the current packet.

When no further header operations are required, steering logic 126 consults the LUTS in table 122 and steers the packet accordingly to its destination, at a steering step 226. The steering decision is made after header modification and may thus be affected the header field values that were modified in the preceding steps.

As noted earlier, the packet may be steered to its destination at this stage through either host interface 110 or network interface 112. In the case of multicast packets, packet processing circuitry 116 may create and send multiple copies of the packet to different destinations (with the required header modifications performed before duplication or after duplication, as explained above).

As would be appreciated, the flow-chart illustrated in the example embodiment of FIG. 2 and described above is cited by way of example. Other suitable flowcharts may be used in alternative embodiments. For example, two or more chained operations may be merged and executed in fewer steps (e.g., a Delete Header and an Insert Header may be combined, to form a Replace Header instruction); in some embodiments, more header operations may be defined. In embodiments, changes of the headers may be proceeded by recalculating check-sums and/or integrity signatures.

FIG. 3 is a listing of a pseudo-code that describes header modification instructions in accordance with embodiments of the present invention. The pseudo-code is an alternative representation of the flow chart illustrated in FIG. 2, and defines (in pseudo-code resolution) how the four header instructions—Insert-Header-In-Line, Insert-Header-With-Pointer, Remove-Partial-Header and Remove-Complete-Headers are executed.

As would be appreciated, the Pseudo-Code listed in the example embodiment of FIG. 3 is cited by way of example. Other suitable Pseudo-codes may be used in alternative embodiments. For example, common operations like adding start anchor and offset values (line 9, 14, 19) may be done commonly after the instruction is fetched in line 2.

Figure 4:
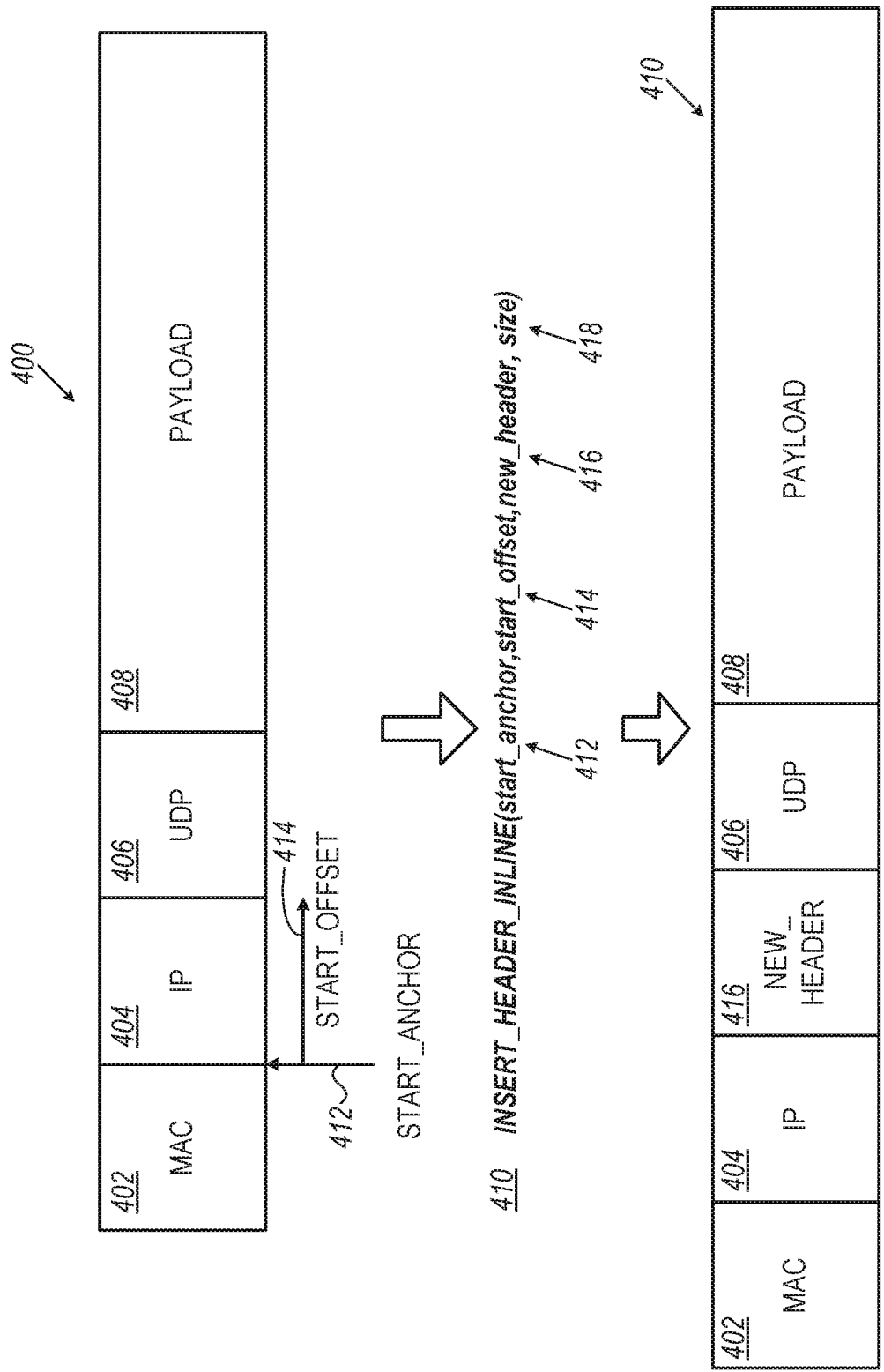
FIG. 4 is a block diagram that schematically illustrates a packet, before and after a header-modifying operation, in accordance with embodiments of the present invention.

FIG. 4 is a block diagram that schematically illustrates a packet, before and after a header-modifying operation, in accordance with embodiments of the present invention. A packet 400 comprises a set of headers comprising a MAC header 402, followed by an IP header 404 and a UDP header 406. The set of headers is followed by a packet-payload 408 (packet 400 may comprise additional fields such as a footer, which are not shown).

Parser/header-modifier 124 (FIG. 1) receives a Packet instruction 410, which specifies the addition of a new header. The parameters of the operation are a Start-Anchor Parameter 412, a Start-Offset parameter 414, a New-Header parameter 416 and a size parameter 418. The Start-Anchor parameter points to the start of IP header 404, and the Start-Offset parameter adds the length of the IP header to the Start-Anchor, so that the new header will be inserted at the place where, before operation executed, UDP header 406 starts.

Operation 410 modifies packet 400, and creates a Modified-Packet 420. Modified Packet 420 comprises the same headers and payload as the original packet 400 did. In addition, Modified-Packet 420 comprises New-Header 416, located after the IP-Header and before the UDP-Header (as mentioned above, the new packet may need other changes, such as a new checksum).

Figure 5:
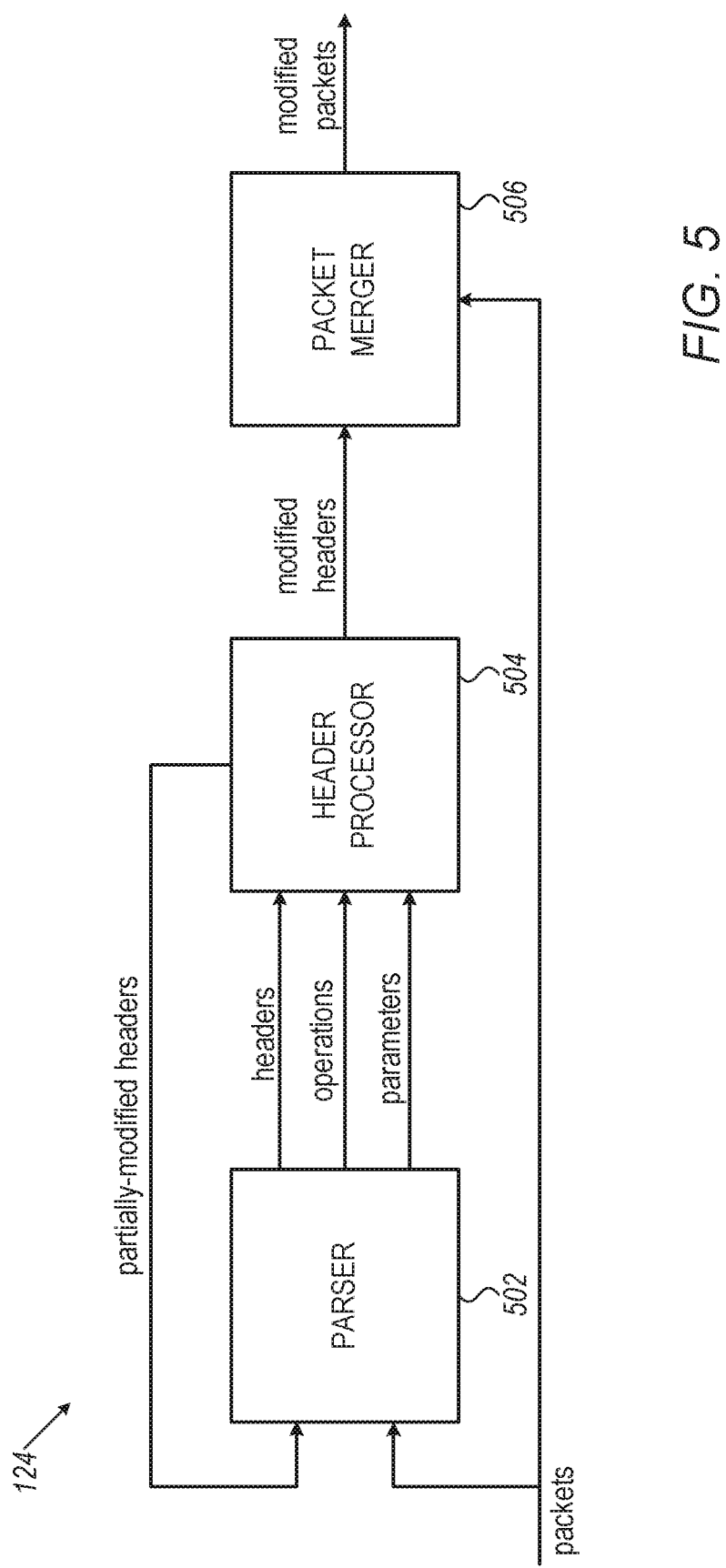
FIG. 5 is a block diagram that schematically illustrates the structure of a Parser/Header Modifier, in accordance with an embodiment of the present invention.

FIG. 5 is a block diagram that schematically illustrates the structure of Parser/Header Modifier 124, in accordance with an embodiment of the present invention.

Parser/header-modifier 124 (which was presented with reference to FIG. 1 above) comprises a Parser 502, a Header-Processor 504 and a Packet-Manager 506. Parser 502 is configured to extract headers from input packets and, indexing into Lookup-Tables in table 122 (FIG. 2), extract the required header operations and parameters. The Parser then sends the headers, header operations and parameters to Header-Processor 504.

Header-Processor 504 executes header operations, and modifies the header; if further header modification operations are required the Header-Processor sends the modified header back to Parser 502, which consults the Lookup-Tables in table 122 for further operations (if any).

The sequence wherein the Parser extracts an operation, the Header-Processor executes the operation and sends the partially modified header back to the Parser repeats until no more header operations are required. At this stage, the Header-Processor sends the modified header to Packet-Merger 506 which adds the new header to the packet, replacing the old header, and forwards the modified packet downstream (e.g., to Steering-Logic 126, FIG. 1).

As would be appreciated, parser/header modifier 124 illustrated in FIG. 5 and described hereinabove is cited by way of example. In alternative embodiments various suitable structures may be used. For example, in some embodiments the Parser forwards to the Packet Merger the payload of the packet rather than the full packet. In another embodiment, table 122 (or part thereof) is be implemented in the Header-Processor, which sequences through chained header operations without sending partial results to the parser.

Figure 6:
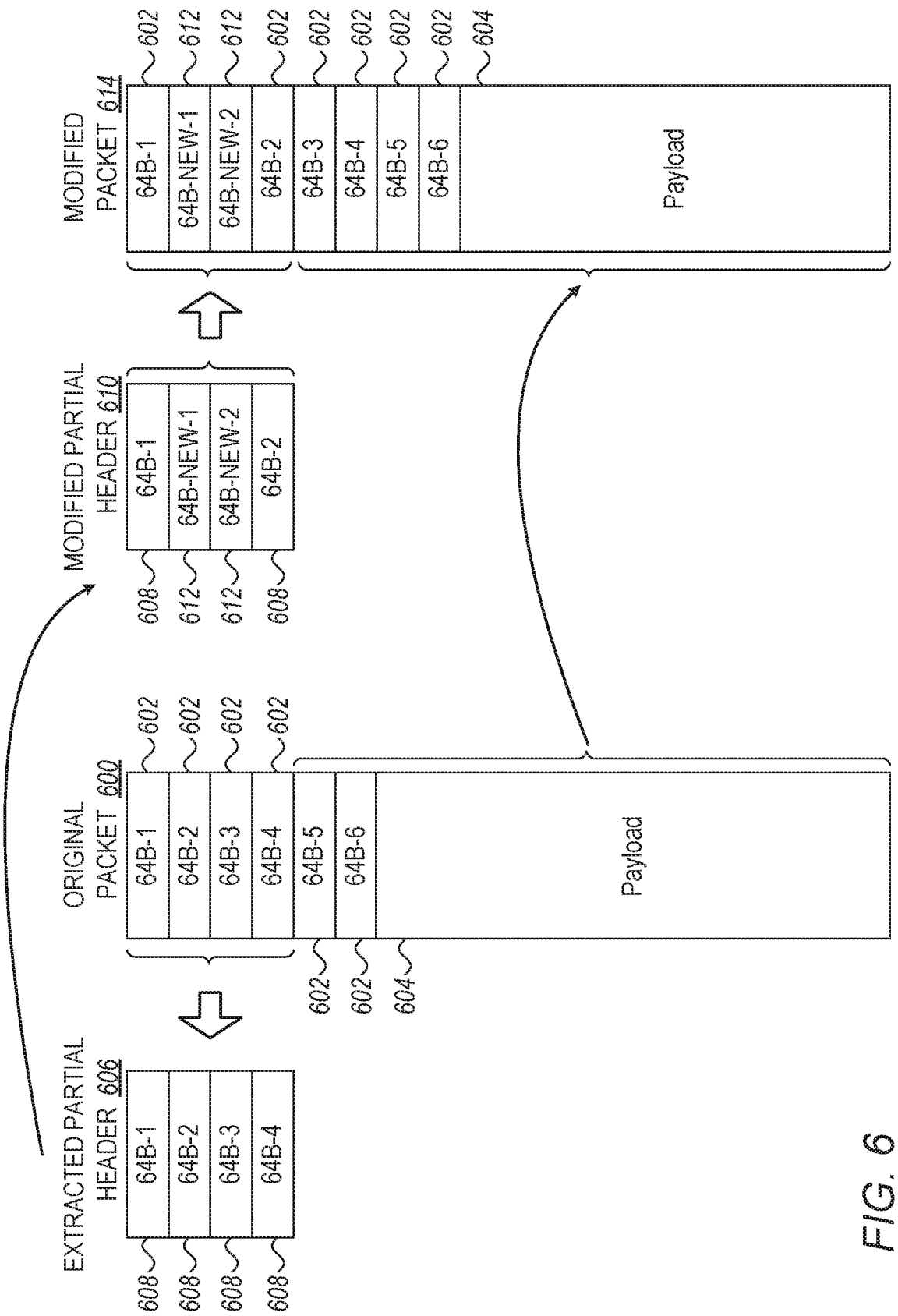
FIG. 6 is a block diagram that schematically illustrates the contents of packet and modified headers before and after an insert-in-line operation, in accordance with embodiments of the present invention.

FIG. 6 is a block diagram that schematically illustrates the contents of packet and modified headers before and after an insert-in-line operation, in accordance with embodiments of the present invention. An original packet 600 comprises six 64-byte header-units 602, and a payload 604 (which may contain a footer). Header-units 602 are marked 64B-1 through 64B-6. Each header unit may be a complete or a partial header.

Parser 502 (FIG. 5) extracts the first four header-units 602, marked 64B-1 through 64B-4, and sends the Partial headers in an Extracted-Partial-Header 606 to Header-Processor 504 (FIG. 5), along with the required header-modification operation and parameters (which include, in this case, the new header).

The Header-Processor then inserts the new header according to the start anchor and start offset, to create a Modified-Partial-Header 610. Modified-Partial-Header 610 comprises the first header unit 64B-1, followed by two new header-units 612 designated 64B-NEW-1 and 64B-NEW-2 this example embodiment, the size of the new header parameter is 128 bytes, which are split between 64B-NEW-1 and 64B-NEW-2)).

The Header-Processor then generates a Modified-Packet 614 by copying the Modified-Partial-Header to the first 256 of the new packet, and then copying the original packet, from 64B-3 to the end, into the modified packet.

The header modification instruction described above may be followed by additional header modification instructions, until the desired new header is created.

As would be appreciated, the contents of the packet and headers which are illustrated in FIG. 6 and described above are cited by way of example. In alternative embodiments various suitable contents may be used. For example, the division to 64-byte header units may change in some embodiments, the resolution may be smaller (e.g. 16 bytes) or larger. In some embodiments, the header operation is split to smaller operations; e.g., operations that handle a single 64 byte partial header only. In an embodiment, compound operations may be employed (e.g., add two new headers).

Although the embodiments described herein mainly address packet header processing in communication networks, the methods and systems described herein can also be used in other applications, such as in telemetry (e.g., adding telemetry to a packet), adding or removing timestamps, passing information between a NIC and a Switch, and passing metadata to software by appending the data to a packet.

Thus, according to the embodiments described hereinabove and illustrated in FIGS. 1 through 6, a NIC may feature table-based header-modification capability, which is done at high speed without CPU intervention.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Communication apparatus, comprising:
a host interface, which is configured to be connected to a peripheral component bus so as to communicate via the bus with a central processing unit (CPU) and a memory of a host computer;
a network interface, which is configured to be connected to a network so as to transmit outgoing data packets to the network and receive incoming data packets from the network; and
packet processing circuitry, which is coupled between the host interface and the network interface and is configured to:
receive from a first interface, selected from among the host interface and the network interface, a data packet comprising a set of one or more headers that comprise header fields having respective values;
identify, responsively to a value of at least one of the header fields, a corresponding header modification instruction that (i) is stored in the memory of the host computer and is accessed by the packet processing circuitry via the peripheral component bus, (ii) specifies insertion of one or more fields in a specified location in the set of headers, and (iii) comprises a pointer to a memory address in which values of the one or more fields to be inserted are stored;
modify the set of headers in accordance with the header modification operation, by reading the one or more values from the memory location and inserting the one or more values into the set of headers; and
transmit the data packet, with the modified set of headers, through a second interface selected from among the host interface and the network interface.

2. The apparatus according to claim 1, wherein the one or more fields to be inserted are one or more protocol-specific headers.

3. The apparatus according to claim 1, wherein the packet processing circuitry is configured to create a gap in the set of headers, and to insert one or more fields in the gap.

4. The apparatus according to claim 1, wherein one of the first and second interfaces is the host interface and the other of the first and second interfaces is the network interface.

5. The apparatus according to claim 1, wherein both the first and second interfaces are the network interface, such that the data packet is received from the network and is looped back to the network after modification of the header.

6. The apparatus according to claim 1, wherein both the first and second interfaces are the host interface, such that the data packet is received from a process running on the CPU and is looped back, after modification of the header, to another process running on the CPU.

7. The apparatus according to claim 1, wherein the packet processing circuitry is configured to identify, responsively to the modified set of headers, a steering instruction in a packet steering table, and to steer the packet to a destination via the second interface in accordance with the identified steering instructions.

8. A method for communication, comprising:
connecting a host interface to a peripheral component bus so as to communicate via the bus with a central processing unit (CPU) and a memory of a host computer;
connecting a network interface to a network so as to transmit outgoing data packets to the network and receive incoming data packets from the network; and
using packet processing circuitry, which is coupled between the host interface and the network interface:
receiving from a first interface, selected from among the host interface and the network interface, a data packet comprising a set of one or more headers that comprise header fields having respective values;
identifying, responsively to a value of at least one of the header fields, a corresponding header modification instruction that (i) is stored in the memory of the host computer and is accessed by the packet processing circuitry via the peripheral component bus, (ii) specifies insertion of one or more fields in a specified location in the set of headers, and (iii) comprises a pointer to a memory address in which values of the one or more fields to be inserted are stored;

modifying the set of headers in accordance with the header modification operation, by reading the one or more values from the memory location and inserting the one or more values into the set of headers; and transmitting the data packet, with the modified set of headers, through a second interface selected from among the host interface and the network interface.

9. The method according to claim 8, wherein the one or more fields to be inserted are one or more protocol-specific headers.

10. The method according to claim 8, wherein modifying the set of headers comprises creating a gap in the set of headers, and inserting one or more fields in the gap.

11. The method according to claim 8, wherein one of the first and second interfaces is the host interface and the other of the first and second interfaces is the network interface.

12. The method according to claim 8, wherein both the first and second interfaces are the network interface, such that the data packet is received from the network and is looped back to the network after modification of the header.

13. The method according to claim 8, wherein both the first and second interfaces are the host interface, such that the data packet is received from a process running on the CPU and is looped back, after modification of the header, to another process running on the CPU.

14. The method according to claim 8, and comprising identifying, responsively to the modified set of headers, a steering instruction in a packet steering table, and steering the packet to a destination via the second interface in accordance with the identified steering instructions.

15. Communication apparatus, comprising:

a host interface, which is configured to be connected to a peripheral component bus so as to communicate via the bus with a central processing unit (CPU) and a memory of a host computer;

a network interface, which is configured to be connected to a network so as to transmit outgoing data packets to the network and receive incoming data packets from the network; and packet processing circuitry, which is coupled between the host interface and the network interface and is configured to:

receive, through the host interface from a process running on the CPU, a data packet comprising a set of one or more headers that comprise header fields having respective values;

identify, responsively to a value of at least one of the header fields, a corresponding header modification instruction that specifies insertion of one or more fields in a specified location in the set of headers, the header modification instruction comprising a pointer to a memory address in which values of the one or more fields to be inserted are stored;

modify the set of headers in accordance with the header modification operation, by reading the one or more values from the memory location and inserting the one or more values into the set of headers; and transmit the data packet, with the modified set of headers, through the host interface to another process running on the CPU.

16. Communication apparatus, comprising:

a host interface, which is configured to be connected to a peripheral component bus so as to communicate via the bus with a central processing unit (CPU) and a memory of a host computer;

a network interface, which is configured to be connected to a network so as to transmit outgoing data packets to the network and receive incoming data packets from the network; and packet processing circuitry, which is coupled between the host interface and the network interface and is configured to:

receive from a first interface, selected from among the host interface and the network interface, a data packet comprising a set of one or more headers that comprise header fields having respective values;

identify, responsively to a value of at least one of the header fields, a corresponding header modification instruction that specifies insertion of one or more fields in a specified location in the set of headers, the header modification instruction comprising a pointer to a memory address in which values of the one or more fields to be inserted are stored;

modify the set of headers in accordance with the header modification operation, by reading the one or more values from the memory location and inserting the one or more values into the set of headers; and transmit the data packet, with the modified set of headers, through a second interface selected from among the host interface and the network interface, wherein the packet processing circuitry is further configured to identify, responsively to the modified set of headers, a steering instruction in a packet steering table, and to steer the data packet to a destination via the second interface in accordance with the identified steering instructions.

17. A method for communication, comprising:

connecting a host interface to a peripheral component bus so as to communicate via the bus with a central processing unit (CPU) and a memory of a host computer;

connecting a network interface to a network so as to transmit outgoing data packets to the network and receive incoming data packets from the network; and using packet processing circuitry, which is coupled between the host interface and the network interface:

receiving, through the host interface from a process running on the CPU, a data packet comprising a set of one or more headers that comprise header fields having respective values;

identifying, responsively to a value of at least one of the header fields, a corresponding header modification instruction that specifies insertion of one or more fields in a specified location in the set of headers, the header modification instruction comprising a pointer to a memory address in which values of the one or more fields to be inserted are stored;

modifying the set of headers in accordance with the header modification operation, by reading the one or more values from the memory location and inserting the one or more values into the set of headers; and transmitting the data packet, with the modified set of headers, through the host interface to another process running on the CPU.

18. A method for communication, comprising:
- connecting a host interface to a peripheral component bus so as to communicate via the bus with a central processing unit (CPU) and a memory of a host computer;
- connecting a network interface to a network so as to transmit outgoing data packets to the network and receive incoming data packets from the network; and
- using packet processing circuitry, which is coupled between the host interface and the network interface:
  - receiving from a first interface, selected from among the host interface and the network interface, a data packet comprising a set of one or more headers that comprise header fields having respective values;
  - identifying, responsively to a value of at least one of the header fields, a corresponding header modification instruction that specifies insertion of one or more fields in a specified location in the set of headers, the header modification instruction comprising a pointer to a memory address in which values of the one or more fields to be inserted are stored;
  - modifying the set of headers in accordance with the header modification operation, by reading the one or more values from the memory location and inserting the one or more values into the set of headers;
  - transmitting the data packet, with the modified set of headers, through a second interface selected from among the host interface and the network interface; and
  - identifying, responsively to the modified set of headers, a steering instruction in a packet steering table, and steering the data packet to a destination via the second interface in accordance with the identified steering instructions.

* * * * *